H. C. MARSH.
FLUE FORMER.
APPLICATION FILED FEB. 15, 1909.

934,823.

Patented Sept. 21, 1909.

WITNESSES:
Ethel L. Lister.
Thomas L. Ryan

INVENTOR
Henry C. Marsh

UNITED STATES PATENT OFFICE.

HENRY C. MARSH, OF MUNCIE, INDIANA.

FLUE-FORMER.

934,823.

Specification of Letters Patent.   Patented Sept. 21, 1909.

Application filed February 15, 1909.   Serial No. 478,058.

*To all whom it may concern:*

Be it known that I, HENRY C. MARSH, a citizen of the United States, and a resident of Muncie, in the county of Delaware and State of Indiana, have invented a new and useful Flue-Former, to mold series of flues in crops to be stored in barns, sheds, or other buildings and in stacks, such as all crops stored in a partially-cured condition, for hay or forage, also grains in sheaf or loose, or seed crops waiting to be threshed, or shredded fodder, these flues being formed to promote a free circulation of hot or cold air to complete the curing of the crops.

In order to disclose the device for which I claim Letters Patent and for which I claim I am the sole and original inventor, drawings are herewith submitted; similar characters of reference, refer to corresponding parts throughout the several views, in which—

Figure 1:
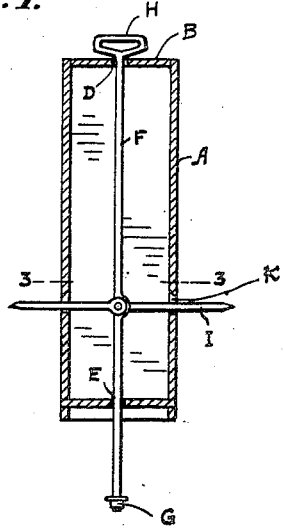
Figure 2:
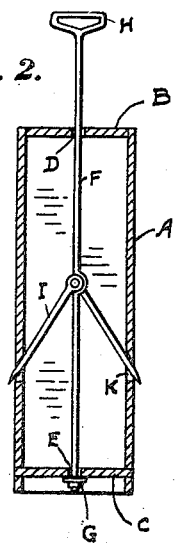
Figure 3:
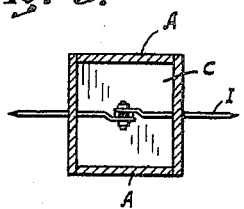
Figure 4:
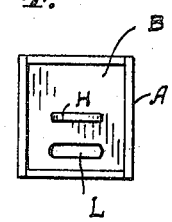

Figure 1 and Fig. 2 are vertical transverse central sectional views of my improved flue-former, in the latter view the handle of the rod being in elevated position. Fig. 3 is a horizontal transverse sectional view on the line 3—3 Fig. 1. Fig. 4 is a top plan view of Fig. 2.

The said flue former has its walls A made of wood of suitable quality and thickness, and is of substantially the proportions as shown. The flue-former is say, twelve by fourteen inches in transverse dimension and forty eight inches in length, and has the upper and lower heads B and C respectively, which heads are each provided with a central perforation D and E. The said flue-former has the head C disposed at such distance above the bottom end of the walls that a clearance between the said head C and the floor or other object upon which the flue-former will rest, is provided.

The rod F which resides loosely in the perforations D and E has the head G and the handle H and loosely secured to said rod are the prongs I the ends of which prongs work loosely in suitable holes K therefor in the wall plates. The head G consists of a nut screwed on to the lower end of the rod and provided with a washer, or a cotter pin and washer. Each of the prongs has its free end tapered and its other end is secured loosely by a suitable bolt to the rod as shown. This head besides forming a practical head as aforesaid makes easy the removability of the rod F and the adjustment of the distance between the lower head of the flue-formers and the pivotal connection for the prongs.

In the flue-former the length of the rod F and the location of the connection for the prongs thereon, are such that when the flue-former is in position for the filling of the crop thereabout the prongs are in the horizontal position, and the handle H will reside upon the head B.

In the upper head of the flue-former is provided a slot like opening L which affords a convenient hand-hold for lifting the flue-former.

The operation of the flue-former is to so place one or a series of them at the place or places where the flues are to be formed. About each flue former the crop is compactly built. As the height of the mass reaches the height of the flue-former, the head of the flue-former is grasped at the hand-hold and while the handle is raised and the prongs retracted, the flue-former is lifted to a higher position leaving the flue-former below. It is desirable that the flue-former should be raised not more than two feet at a time; thus enough of the bottom portion of the flue-former is retained by the crop packed thereabout that there will be no tendency of the flue-former to become jostled out of vertical alinement.

When the handle of the rod is raised it is plain that the prongs are reverted or removed from the outside of the flue-former, so that it can be readily raised and that when the flue-former is raised to the desired height, the handle of the rod is lowered until it rests on the head B. The prongs will have been thrust into the crop and will hold the flue-former in position automatically by the weight of the flue-former resting on the prongs.

If it is desired to permit the free flow of the air through the flue former while the crop is being stored, the upper and lower heads may be constructed of wooden blocks 12 inches long, 3 inches wide and 2 inches thick, with suitable holes, for the handle rod instead of the solid heads shown in the illustrations. The upper head forms a handhold to lift the flue former and the open space below gives easy access to the bolt controlling the prongs on the handle rod.

What I claim as my invention and desire to secure by Letters Patent, is—

1. A device of the kind described consisting of a hollow structure of suitable length, a centrally disposed member loosely supported therein, prongs to pass through apertures therefor in the walls of said hollow structure and having their inner ends loosely connected to said central member so that when the central member is moved the prongs will be actuated substantially as described.

2. A device of the kind described consisting of a hollow structure of suitable length and having a lower and an upper head, a member having a handle on its upper end and a head on its lower end, and disposed centrally and adapted to pass slidingly through said heads, the said member being of length greater than that of the hollow structure, prongs to pass through apertures therefor in the walls of said hollow structure and having their inner ends loosely connected to the central member.

3. A device of the kind described consisting of a hollow structure of suitable length and having a lower and an upper head, the lower head being disposed a short distance above the bottom edge of the hollow structure and the upper head being provided with a hand hold, a member having a handle on its upper end and a head on its lower end, and disposed centrally and adapted to pass slidingly through said heads, the said member being of length greater than that of the hollow structure, prongs to pass through apertures therefor in the walls of said hollow structure and having their inner ends loosely connected to the central member.

In testimony whereof I sign my name to this specification in the presence of two subscribing witnesses.

HENRY C. MARSH.

Witnesses:
ETHEL L. LISTER,
JNO. W. RYAN.